United States Patent
Martin et al.

(10) Patent No.: US 7,953,988 B2
(45) Date of Patent: May 31, 2011

(54) MODULAR TAMPER RESISTANT ENCLOSURE FOR SECURE SYSTEMS

(75) Inventors: Charles R. Martin, Louisville, CO (US); Carl T. Madison, Jr., Windsor, CO (US)

(73) Assignee: Oracle America, Inc., Redwood City, CA (US)

( * ) Notice: Subject to any disclaimer, the term of this patent is extended or adjusted under 35 U.S.C. 154(b) by 806 days.

(21) Appl. No.: 11/972,587

(22) Filed: Jan. 10, 2008

(65) Prior Publication Data

US 2009/0183011 A1 Jul. 16, 2009

(51) Int. Cl.
*G06F 11/30* (2006.01)

(52) U.S. Cl. ........................................ 713/194; 713/193

(58) Field of Classification Search .................. 713/194, 713/193
See application file for complete search history.

(56) References Cited

U.S. PATENT DOCUMENTS

| | | | |
|---|---|---|---|
| 5,117,457 A * | 5/1992 | Comerford et al. | 713/194 |
| 5,533,123 A * | 7/1996 | Force et al. | 713/189 |
| 6,157,721 A * | 12/2000 | Shear et al. | 380/255 |
| 6,292,569 B1 * | 9/2001 | Shear et al. | 380/255 |
| 6,292,898 B1 * | 9/2001 | Sutherland | 726/34 |
| 6,836,847 B1 * | 12/2004 | Zinger et al. | 726/19 |
| 7,120,802 B2 * | 10/2006 | Shear et al. | 713/194 |
| 7,356,143 B2 * | 4/2008 | Morten | 380/201 |
| 7,581,092 B2 * | 8/2009 | Shear et al. | 713/2 |

* cited by examiner

*Primary Examiner* — Krisna Lim
(74) *Attorney, Agent, or Firm* — Marsh Fischmann & Breyfogle LLP; Jonathon A. Szumny; Kent A. Lembke

(57) ABSTRACT

An active membrane creates a secure area around one or more devices. The active membrane forms a physical barrier between the encased secure area and an external environment. Linked to the membrane and acting as the sole interface between the secure area and the outside environment is a boundary interface. The boundary interface tunnels data to the secure area in a secure fashion. According to one embodiment of the present invention, the boundary interface utilizes symmetric and/or asymmetric cryptographic techniques to secure the data path. The boundary interface is also coupled to the active membrane, and upon the membrane sensing a breach of the membrane (thus signifying an intrusion of the secure area), the boundary interface can be configured to sever the data paths linking the secure area with the unsecured area as well as take other active steps to ensure that data within the secure area is not compromised.

20 Claims, 2 Drawing Sheets

MODULAR TAMPER RESISTANT ENCLOSURE FOR SECURE SYSTEMS

BACKGROUND OF THE INVENTION

1. Field of the Invention

Embodiments of the present invention relate, in general, to systems and methods for data protection and particularly to enclosing secure systems in tamper resistant enclosures.

2. Relevant Background

Cryptography is, in its broadest sense, the art of hiding information. Historically cryptography referred to encryption, the process of converting ordinary information (plaintext) into unintelligible gibberish (i.e., ciphertext), and decryption, the reverse, moving from unintelligible ciphertext to plaintext. In modern times cryptography encompasses a wide range of technology and techniques. These include symmetric-key cryptography, public-key (also, more generally, called asymmetric key) cryptography, cryptographic primitives, and cryptanalysis.

Cryptography utilizing symmetric and asymmetric-key cryptographic techniques employs a cipher and a key. A cipher is two or more algorithms that perform encryption and the reversing decryption. The detailed operation of a cipher is controlled both by the algorithm and, in each instance, by a key. This is a secret parameter (ideally, known only to the communicants) for a specific message exchange context. Keys are important, as ciphers without variable keys are trivially breakable and therefore less than useful for most purposes. Thus the protection of the keys, and to some extent the algorithms themselves, is an important part of data security.

A typical cryptographic system includes a secure environment housing the cryptographic algorithm(s) and, in the case of a public-private key pair, the private key. Received encrypted data generated by the related public key can be decrypted using the private key. The private key must remain secret while the public key can be freely distributed.

As will be appreciated by one skilled in the art of cryptography, many systems exist to securely manage cryptographic keys. One aspect of that management is the security of the keys and other cryptographic material to what is known in the art as an insider attack. An insider attack is an attack or intrusion from an entity that is trusted. This entity, having direct access to the system, can replace or insert devices in the middle of the data path to capture data and/or the keys.

This type of intrusion is generally addressed by maintaining complete physical security of the device and wires that contain and transport the data or by protecting the data cryptographically. Many systems are, however, incapable of, or it is infeasible to support, data cryptography. Thus physical security becomes the primary means to ensure that the cryptographic keys remain secure.

Current boundary protection is either tamper resistant or tamper evident. Tamper evident techniques simply present evidence that a device or system has been tampered with and thus the contents can no longer be trusted. Tamper resistant protection is understood to mean that intrusion into the device will result in damage making the device nonfunctional. One simple tamper resistant technique is to seal the components in epoxy. Many cryptographic functions and keys can be hard wired into an integrated circuit or the like. If one could examine the circuit, the key and algorithms would be revealed. Thus encasing the chip in epoxy prevents reverse engineering because removal of the epoxy would theoretically destroy the enclosed components.

This type of physical barrier however is not fool proof. While penetrating a chip using a barrier of this type is likely to render it non-functional, portions of the technology within the barrier may be recoverable. Furthermore, this type of barrier fails to protect an intrusion into the data path. The current art does not provide a cryptographically secure interface that is sensitive to physical intrusion.

SUMMARY OF THE INVENTION

The present invention provides systems and methods for creating a tamper resistant enclosure for secure systems. According to one embodiment of the present invention, a boundary interface is coupled to an active membrane to form a tamper resistant enclosure. The boundary interface is linked to the active membrane such that upon an intrusion of the membrane or breach of the membrane, the boundary interface acts to protect the confidential data maintained within the enclosure.

The features and advantages described in this disclosure and in the following detailed description are not all-inclusive; many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to one embodiment of the present invention, an active membrane is configured to create a secure area around one or more unsecured devices. The active membrane forms a physical barrier between the secure area and an unsecured area and is configured to sense a breach of the membrane. Linked to the membrane and acting as the sole interface between the interior secure area and the outside unsecured area is a boundary interface. The boundary interface tunnels data to the secure area in a secure fashion. According to one embodiment of the present invention, the boundary interface utilizes symmetric and asymmetric cryptographic techniques to secure the data path. The boundary interface is also coupled to the active membrane, and upon the membrane sensing a breach of the membrane (thus signifying an intrusion of the secure area), the boundary interface can be configured to sever the data paths linking the secure area with the unsecured area.

In another embodiment of the present invention, sensing a breach of the membrane can trigger the boundary interface to destroy confidential data maintained within the secure area. According to another aspect of the invention, the keys used to encrypt and decrypt the data along the data pathway can be changed or zeroed. Based on an indication that the physical security of the secure area has been compromised, the boundary interface acts to protect the security of the material within the secure environment.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
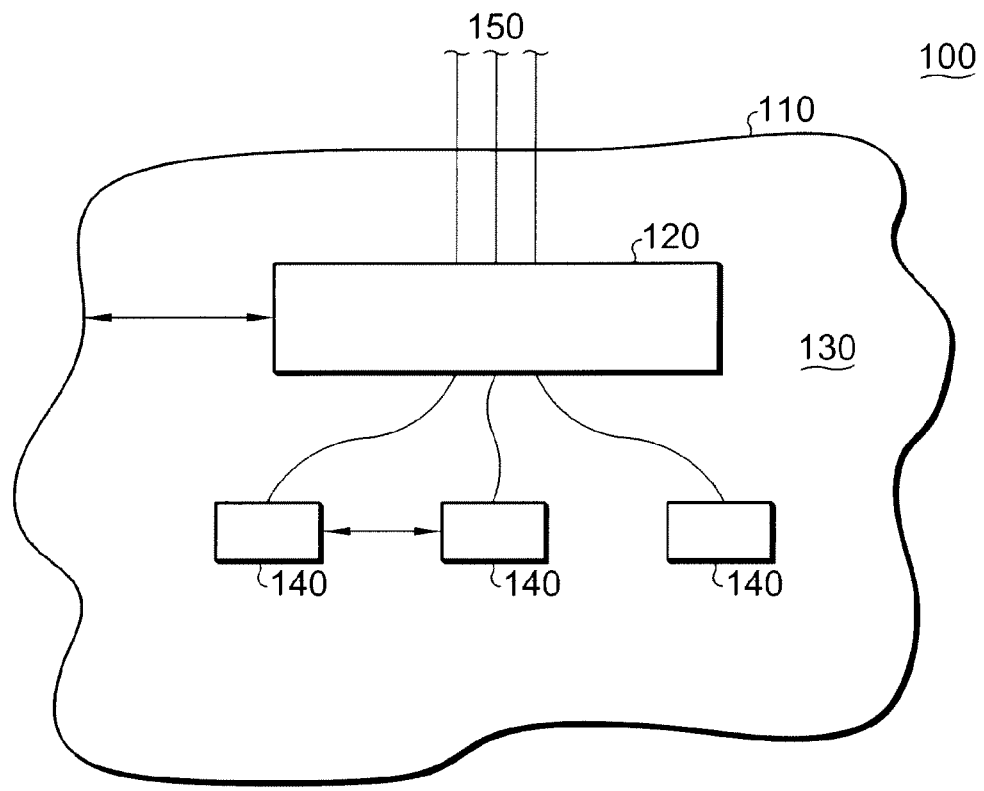
FIG. 1 shows a high level block diagram according to one embodiment of the present invention for a tamper resistant environment for secured systems.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

A secure environment formed by combining an active membrane and a boundary interface is hereinafter described. A secure enclosure is created by an active membrane that is physically and communicatively coupled to a boundary interface. The active membrane is configured to sense and communicate any type of intrusion into the secured enclosure. Any breach of the membrane is sensed and communicated to the boundary interface. Upon receiving an indication that the secured enclosure is no longer physically intact, the boundary interface acts to maintain the security of the components and data contained within the environment.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 provides a high level block representation of a tamper resistant environment for secure systems according to one embodiment of the present invention. The tamper resistant system 100 comprises an active membrane 110 and a boundary interface 120. The combination of the membrane 110 and the interface 120 forms a secure environment 130 within which a plurality of unsecured devices 140 can exist without fear of external intrusion. As will be appreciated by one skilled in the relevant art, the unsecured devices 140 can also include secured devices. In such an architecture the present invention provides an additional layer of security. Unsecured devices 140 can include databases, processors, various forms of memory media, and other components that require a tamper resistant environment. These unsecured devices 140 are communicatively coupled to components and systems outside of the secure environment 130 via a plurality of data paths 150 that traverse the boundary interface 120.

Figure 2:
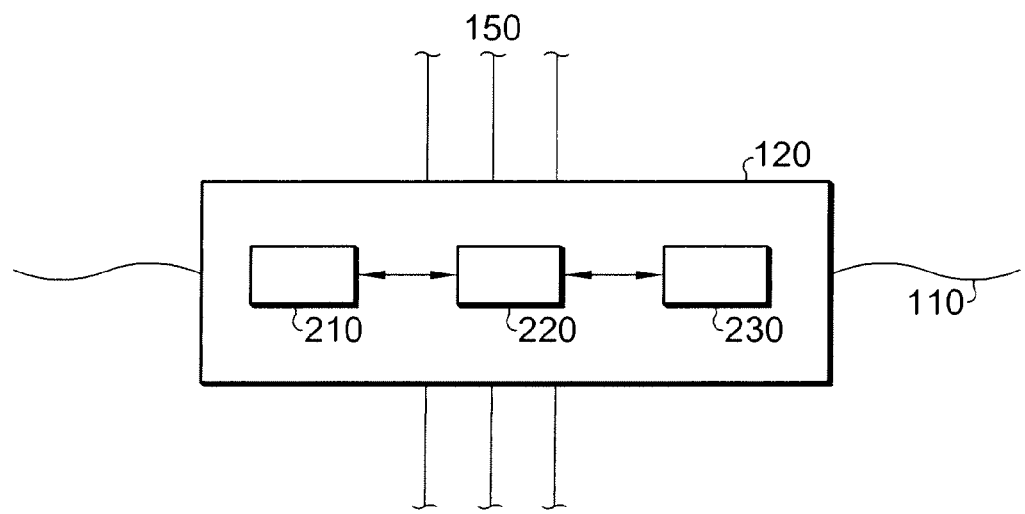
FIG. 2 shows a block diagram of components included within a boundary interface according to one embodiment of the present invention.

The boundary interface 120 is the sole interface between the unsecured devices 140 existing within the tamper resistant environment and the outside environment. FIG. 2 shows, according to one embodiment of the present invention, components within the boundary interface that facilitate the creation and maintenance of the tamper resistant environment. The boundary interface 120 includes, in one embodiment of the present invention, a memory 210, a processor 220 or some device capable of execution of instructions embodied as software, and cryptographic key(s) 230.

The memory can be in the form of various storage media and is, at least in one embodiment of the present invention, non-volatile. Portions of software code controlling the data paths between the secure environment 130 and the outside environment can be maintained in the memory 210. This can include various cryptographic algorithms as would be known to one skilled in the cryptographic arts. The memory 210 can also include software portions that can direct the boundary interface 120 to sever the links between the secure environment 130 and the outside world. It can also direct keys held in memory to be zeroed or changed. Furthermore it can contain instruction to be conveyed to the unsecured devices 140 to destroy or erase their contents. The processor 220, or similar device capable of executing executable code, retrieves the code and executes the instructions facilitating securing the devices 140 and information contained within the secure environment.

When cryptographic techniques are used to secure the data paths, the processor 220 retrieves and executes various cryptographic algorithms stored in memory 210 as well as the necessary keys stored in a separate storage location 230. The keys are, in one embodiment of the present invention, stored in volatile memory so as to further enhance their ability to be zeroed or destroyed upon a breach of the membrane 110.

To better illustrate the novel features of the present invention, consider the following example. Assume that a plurality of devices are identified as in need of operating within a secure, tamper resistant environment. These devices may be in communication with one another or operate independently. In addition to these devices is a boundary interface. Each device or group of devices communicates to entities outside of the environment through the boundary interface. The boundary interface and each of the devices are surrounded by an active membrane that is communicatively coupled to the boundary interface. The active membrane is a casing that can sense a physical intrusion. The act of tearing, puncturing, or destroying the membrane results in a signal that is, in this case, conveyed to the boundary interface.

The data paths exiting the boundary interface traverse the active membrane. The data and communications that are exchanged via these external data paths are secured by the boundary interface. The boundary interface encrypts data coming from the devices within the membrane prior to its exit from the secure environment using a cryptographic technique. Similarly, encrypted data that is incoming is decrypted by the boundary interface prior to being delivered to a device within the environment. In another embodiment data coming into the boundary interface can be encrypted by the boundary interface and stored in the secure environment in its encrypted form.

When the active membrane senses an intrusion of some type a signal is sent to the boundary interface. The boundary interface can react to this intrusion in a number of ways. The key stored in the boundary interface can be zeroed. Once zeroed, the data that was previously encrypted by the interface and stored within the membrane will remain secure. Similarly the links between the boundary interface and the external environment can be severed to prevent additional incoming data from being compromised. The boundary interface can also act to destroy data maintained within the secure environment on one or more of the devices.

Since the boundary interface is within the secure environment, an attempt to compromise the boundary interface will also result in a sensed intrusion by the membrane and initiate the data protection steps outlined above.

Figure 3:
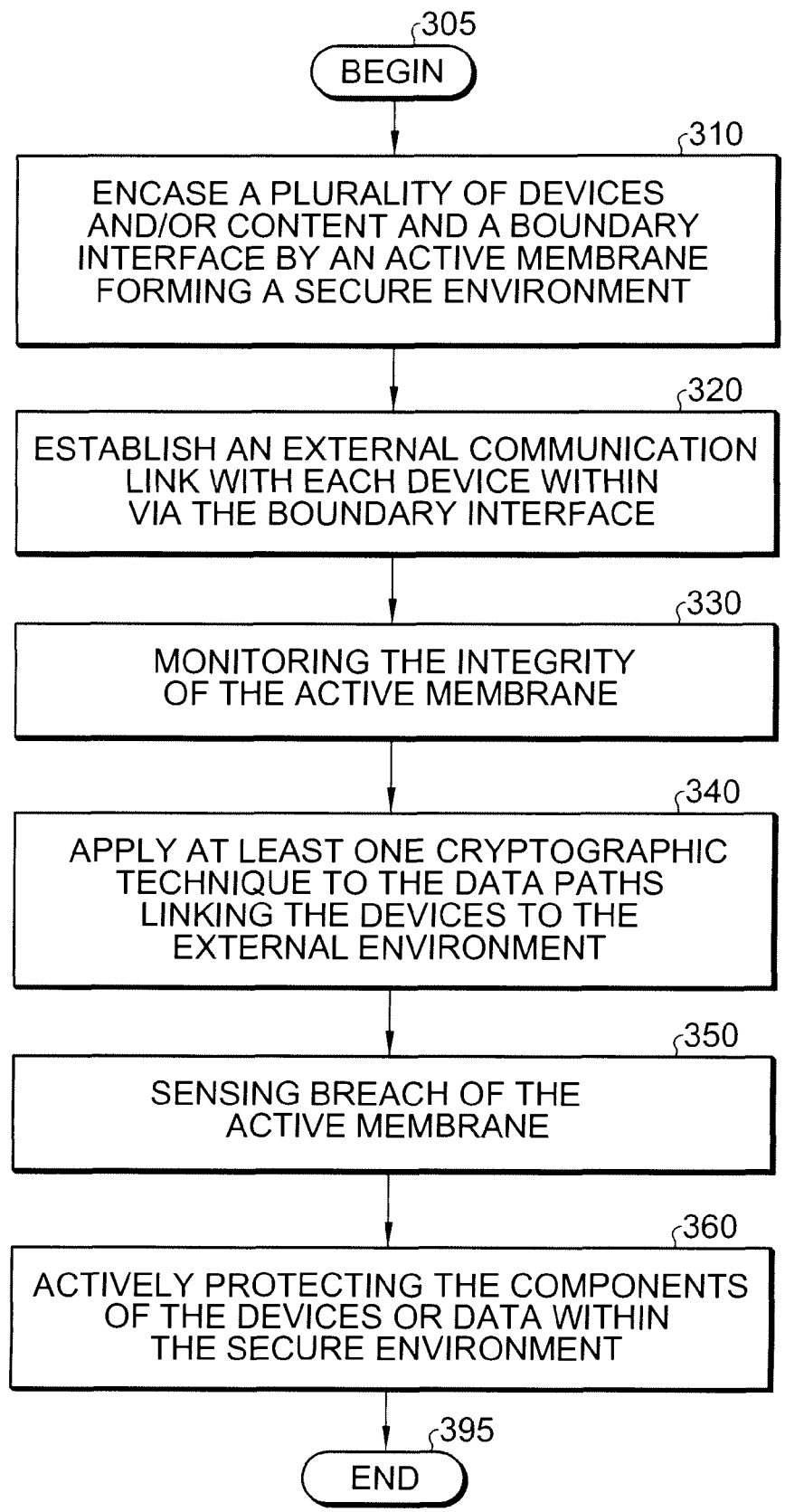
FIG. 3 is a flowchart showing one method embodiment for securing data and/or devices within a tamper resistant enclosure, according to the present invention.

FIG. 3 is a flowchart illustrating methods of implementing an exemplary process for securing a device or data within a tamper resistant enclosure. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As shown in FIG. 3 the process begins 305 with the encasement 310 of a plurality of devices and a boundary interface by an active membrane to form a secure environment. The active membrane is communicatively coupled to the boundary interface. The devices may themselves be storage media for the storage of data. External communication links are established 320 with each device within the secure environment via the boundary interface.

Once the membrane is in place the integrity of the membrane is continuously monitored 330. The boundary interface as the sole link between the devices encased by the membrane and the external environment forms 340 a plurality of secure data paths using at least one cryptographic technique. Upon the active membrane sensing 350 an intrusion or breach of the membrane a signal is sent from the membrane to the boundary interface. The boundary interface then takes active steps 360 to protect the security of the devices and content within the secure environment ending the process 395. These steps can include severing the data paths, zeroing encryption/decryption keys, destroying or causing the destruction of data maintained within the environment, or any similar steps that ensure that the security of the devices or content held within is not compromised.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention. The particular naming and division of the modules, managers, functions, systems, engines, layers, features, attributes, methodologies, and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies, and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A system for securing an electronic environment, comprising:
    an active membrane comprising a physical casing;
    a secure area within the active membrane, wherein the active membrane is configured to sense a breach of the active membrane from an unsecured area to the secured area;
    a boundary interface providing a sole link between the secure area and the unsecured area, wherein the boundary interface is coupled to the active membrane; and
    at least one electronic device contained by the active membrane within the secure area, wherein the boundary interface is configured to sever the link to limit compromise of the at least one electronic device responsive to the active membrane sensing the breach of the membrane.

2. The system of claim 1 wherein the boundary interface is configured to destroy unsecured data of the at least one device responsive to the active membrane sensing the breach.

3. The system of claim 1 wherein the boundary interface includes a machine capable of executing instructions embodied as software, and a memory storing a plurality of portions of software, wherein one of said software portions is configured to secure the link using a cryptographic technique.

4. The system of claim 3 wherein the cryptographic technique includes symmetric cryptography.

5. The system of claim 3 wherein the cryptographic technique includes asymmetric cryptography.

6. The system of claim 3 wherein the boundary interface is configured to zero cryptographic keys of the cryptographic technique responsive to the active membrane sensing the breach.

7. The system of claim 3 wherein the memory is volatile memory and the boundary interface is configured to clear the memory responsive to the active membrane sensing the breach.

8. A method for creating a secure electronic environment, comprising:
    encasing a plurality of electronic devices within an active membrane to create a secure area within the active membrane that houses the device, wherein the active membrane comprises a physical barrier between the secure area and an unsecured area, and wherein the active membrane is configured to sense a breach of the membrane; and
    establishing an external link between the secure area and the unsecured area via a boundary interface, wherein the boundary interface is coupled to the active membrane, and wherein the boundary interface severs the external link responsive to the active membrane sensing the breach of the membrane.

9. The method of claim 8 wherein the boundary interface exclusively links the secure area with the unsecured area.

10. The method of claim 8 further comprising configuring the boundary interface to destroy data within the secure area responsive to the active membrane sensing the breach.

11. The method of claim 8 wherein the boundary interface secures the external link using a cryptographic technique.

12. The method of claim 11 wherein the cryptographic technique includes symmetric cryptography.

13. The method of claim 11 wherein the cryptographic technique includes asymmetric cryptography.

14. The method of claim 8 further comprising severing the external link in response to the active membrane sensing the breach.

15. The method of claim 8 wherein at least one of the devices within the secure area includes encrypted data that is encrypted using a key stored on the boundary interface, and responsive to the active membrane sensing the breach, the key is zeroed.

16. The method of claim 8 wherein the external link includes a plurality of data paths and wherein each of the data paths are cryptographically secured using a key stored in volatile memory by the boundary interface.

17. The method of claim 16 wherein responsive to the active membrane sensing breach the key stored in volatile memory is zeroed.

18. A tamper-resistant enclosure for at least one electronic device, comprising:
    an active membrane, comprising:
        a physical casing; and
        at least one secure area within the physical casing and configured to store at least one electronic device, wherein the active membrane is configured to sense a breach of the physical casing;
    a boundary interface disposed within the secure area, wherein the boundary interface is configured to encrypt and/or decrypt data traveling from and/or to the at least one electronic device; and
    at least one data link that interconnects the boundary interface to an unsecured area outside of the active membrane, wherein the at least one data link traverses the active membrane, and wherein the boundary interface is configured to limit compromise of the at least one electronic device responsive to the active membrane detecting a breach of the physical casing.

19. The enclosure of claim 18, wherein the boundary interface comprises:
    a memory comprising at least one software portion that secures the at least one data link using a cryptographic technique; and
    a processor that executes at least one instruction of the at least one software portion.

20. The enclosure of claim 18, wherein the breach comprises at least one of a tear or a puncture in the physical casing.

* * * * *